US009323286B2

(12) United States Patent
Alsup (10) Patent No.: US 9,323,286 B2
(45) Date of Patent: Apr. 26, 2016

(54) AD-HOC SYNCHRONIZATION OF INDUSTRIAL CONTROL NETWORKS (71) Applicant: Andrew David Alsup, Albuquerque, NM (US)

(72) Inventor: Andrew David Alsup, Albuquerque, NM (US)

(73) Assignee: INNOVASIC, INC., Albuquerque, NM (US)

( * ) Notice: Subject to any disclaimer, the term of this patent is extended or adjusted under 35 U.S.C. 154(b) by 554 days.

(21) Appl. No.: 13/624,907

(22) Filed: Sep. 22, 2012

(65) Prior Publication Data

US 2014/0089717 A1 Mar. 27, 2014

(51) Int. Cl.
*G06F 1/12* (2006.01)
*H04L 7/00* (2006.01)
*G05B 19/05* (2006.01)

(52) U.S. Cl.
CPC . *G06F 1/12* (2013.01); *G05B 19/05* (2013.01)

(58) Field of Classification Search
None
See application file for complete search history.

(56) References Cited

U.S. PATENT DOCUMENTS

| 5,200,976 | A | * | 4/1993 | Ishihara et al. ............... 375/222 |
| 5,202,822 | A | * | 4/1993 | McLaughlin et al. .......... 700/82 |
| 5,379,278 | A | * | 1/1995 | Safadi ............................ 370/221 |
| 5,704,030 | A | * | 12/1997 | Kanzaki .......................... 714/12 |
| 6,493,832 | B1 | * | 12/2002 | Itakura et al. ................. 713/600 |
| 2002/0088003 | A1 | * | 7/2002 | Salee ............................. 725/111 |
| 2009/0185211 | A1 | * | 7/2009 | Sunayama .................... 358/1.13 |
| 2011/0161717 | A1 | * | 6/2011 | Nojiri ............................ 713/502 |
| 2011/0225443 | A1 | * | 9/2011 | Takahashi et al. ............ 713/503 |
| 2014/0089717 | A1 | * | 3/2014 | Alsup ............................ 713/401 |

* cited by examiner

*Primary Examiner* — Tanh Nguyen
(74) *Attorney, Agent, or Firm* — Donald J Lenkszus (57) ABSTRACT

A method and apparatus are disclosed to provide ad-hoc synchronization in industrial networks between a programmable logic controller and each I/O device without any specific protocol extensions or distributed clock scheme. An embodiment of an industrial control network comprising a Programmable Logic Controller (PLC), a network coupled to the PLC, and a plurality of networked input/output (I/O) devices coupled to the network is provided. Each I/O device comprises: inputs coupled to the network to receive data from the PLC as device input data; and outputs coupled to the network to transmit output data from the I/O device to the PLC. The embodiment further comprises a programmable timer initiating an I/O cycle for the device on a periodic basis. The I/O device is operable to determine a first time period starting at the time at which specific output data arrives from the PLC and ending when the period of the timer ends. The first time period is compared to a predetermined time period. The I/O device is operable to adjust the period of the timer such that the first period approaches the predetermined time period and ad-hoc synchronization is provided between production time of the PLC and timing of the I/O device.

30 Claims, 8 Drawing Sheets

AD-HOC SYNCHRONIZATION OF INDUSTRIAL CONTROL NETWORKS

FIELD OF THE INVENTION

The present invention pertains to industrial control networks, in general.

BACKGROUND OF THE INVENTION

A typical industrial control network includes a programmable logic controller (PLC) and one or more input/output (I/O) devices. Input data is read by the I/O devices and transferred to the PLC. Logic at the PLC generates output data that is sent to the I/O devices to be applied to their output circuits.

One key factor in such a network is the relative timing of the inputs and outputs across the various I/O devices. An output is only considered correct if it has the proper level and the proper timing.

In terms of timing, the following elements are important:
I/O device input sequence, i.e., gathering inputs from physical circuits;
Transmission of inputs from physical circuits over the network;
PLC program execution, i.e., transform of inputs into outputs;
Transmission of outputs from a PLC over the network; and
I/O device output sequence, i.e., applying outputs from the PLC to physical output circuits.

In an ideal system, the I/O device input sequence would have the attributes of a regular period, synchronization with transmission over the network, and synchronization with PLC program execution.

With respect to a regular period, control networks and the underlying control algorithms rely on a regular and consistent sampling period for inputs. Instability/irregularity in sampling can lead to instability in the overall control system.

With respect to synchronization with transmission over the network, if the input sequence is not synchronized with transmission of data over the network then, without substantial over-sampling of network data, there is no guarantee that all samples reach the PLC.

With respect to synchronization with PLC program execution, ideally the PLC program would execute with input data of the "same age" on every cycle. Consistent latency of this data can be accounted for by utilizing control algorithms. If the latency is not consistent, i.e., there is jitter in the input timing path, then the precision of the control is reduced.

Also in an ideal system, the device output sequence would have a similar set of attributes or a regular period, synchronization with outputs transmitted over the network, and synchronization with PLC program execution.

With respect to a regular period, control networks and control algorithms also require consistent output periods to have stable performance.

With respect to synchronization with outputs transmitted over the network, if the output sequence is not synchronized with receipt of data over the network then, without substantial over-sampling of network data, there is no guarantee that all samples from the PLC are delivered to the physical outputs.

With respect to synchronization with PLC program execution, similar to input latency, output latency should be consistent and predictable. Inconsistent latency of output data, i.e., jitter in the output timing path, will result in reduced precision of the control system.

The correlation between PLC program execution and output transmission over the network is entirely under the control of the PLC.

There are typically several types of data transmitted between a PLC and connected devices. Only certain, specific sets of data are of the time-critical nature described here. Various approaches are used to identify this data, depending on the specific protocol in use. For example, in networks utilizing the PROFIBUS communication standard it is data to a specific index, in networks utilizing the PROFINET standard there is a specific Ether-type and connection-specific frame type, in networks utilizing EtherNet/IP it is typically a specific UDP port number, and similarly for other protocols.

There are two basic classes of networks with respect to timing. Some networks operate in a command-response fashion, where all network traffic is controlled by the PLC. This type of network will be called a synchronous network. Examples of this type of network include those that utilize the PROFIBUS communication standard and those that use the Modbus/TCP communications protocol standard.

In other networks the I/O devices transmit input data to the PLC on their own schedule. This will be referred to as an asynchronous network. An example of this type of network is an Ethernet that meets the industrial standard identified as PROFINET.

In a synchronous network, the timing between input transmission and PLC program execution and output transmission over the network is under the control of the PLC. In an asynchronous network, the timing between input transmission and PLC program execution is not directly under the control of the PLC, rather the I/O device determines the timing of input transmission.

In a synchronous network the I/O device has direct control over the timing of the I/O cycle, while the PLC controls both the arrival of output data and the transmission of input data. In an asynchronous network the I/O device has direct control over the timing of the I/O cycle and the transmission of input data, while the PLC controls the timing of output data arrival.

Some networks provide extensions to control this timing. Those networks typically operate by providing a mechanism for synchronization of clocks on the I/O devices with a common clock source, typically on the PLC or on a network node specifically for that purpose. By having a single clock base across all of the I/O devices in the network and the PLC, along with protocol extensions to manage I/O timing based on those clocks, high-performing networks can be built that solve the problem of I/O and processing jitter. Examples of these network extensions include those that are commonly referred to as: CIP-Sync (Common Industrial Protocol), PROFINET IRT (isochronous real time), and PROFIBUS DP-V3 (decentralized peripherals, version 3).

Networks that provide such extensions impose additional hardware requirements on I/O devices and network infrastructure, along with additional complexity and cost in the I/O device software and substantially higher cost for compatible PLCs.

A common approach to organizing the I/O timing on an I/O device is to provide each I/O device with a timer and to base everything on a single timer event. For example, the I/O cycle for the I/O device may be organized as follows:
1. The I/O device timer fires;
2. The I/O device updates output data from network layer of software;
3. The I/O device reads inputs from its associated physical circuits and writes output data to the physical output circuits;

4. The I/O device updates input data to network layer of software; and
5. The input data is transmitted over the network.

The timing of incoming data, i.e., output data from the PLC, is completely asynchronous. It can arrive at any point in the above sequence, or, as the PLC and the I/O device come into phase, the PLC output data may arrive twice during one sequence and not at all in a following sequence, resulting in a set of outputs being skipped. At best, even when not perfectly in phase, the latency will vary by the I/O period. That is, latency from output transmission on the network 100 to the time that outputs are updated at the physical circuits 203 I/O will vary from a base latency to the base latency plus the I/O period.

For example, if the minimum base latency of an output path is 200 microseconds and the I/O period is 10 milliseconds, then the latency will vary from 200 microseconds to 10.2 milliseconds. Taking into account the case where PLC 101 and I/O device 103 are nearly in phase and an output set is missed, the maximum output latency is 20.2 milliseconds.

Similar timing applies to input data to the PLC because the PLC is not synchronized to the production time of the I/O device.

SUMMARY

The present invention provides an I/O device-level solution to the problem of synchronization without the expense of specialized synchronization hardware, software, and configuration tools.

The present invention provides a method and apparatus to perform ad-hoc synchronization in industrial networks between a PLC and each I/O device without any specific protocol extensions or distributed clock scheme.

In an embodiment of an industrial control network comprising a Programmable Logic Controller (PLC), a network coupled to the PLC, and a plurality of networked input/output (I/O) devices coupled to the network, each I/O device comprises: inputs coupled to the network to receive data from the PLC as device input data; and outputs coupled to the network to transmit output data from the I/O device to the PLC. The embodiment further comprises a programmable timer initiating an I/O cycle for the device on a periodic basis. The I/O device is operable to determine a first time period starting at the time at which specific output data arrives from the PLC and ending when the period of the timer ends. The first time period is compared to a predetermined time period. The I/O device is operable to adjust the period of the timer such that the first period approaches the predetermined time period and ad-hoc synchronization is provided between production time of the PLC and timing of the I/O device.

In accordance with an embodiment, each I/O device comprises a processor and software executable by said processor to capture the arrival time of specific time-critical I/O data from the PLC.

In accordance with another embodiment each I/O device comprises: software executable by the processor to initiate an I/O cycle for the I/O device based on a periodic timer; software executable by the processor to compare a predetermined time period to a first time period comprising beginning at the time of arrival of specific data from the PLC plus the timer period; and software executable by the processor to adjust the period of the timer such that the first period approaches the predetermined time period such that ad-hoc synchronization is provided between the PLC and the I/O device.

In the further embodiment each I/O device may comprise: software executable by the processor to initiate an I/O cycle for the I/O device based on a periodic timer and to measure the time delay after receipt of the specific time-critical data from the PLC plus the timer period; software executable by the microprocessor to compare the time delay plus the timer period to a predetermined time delay; and software executable by the microprocessor to adjust the period of the timer to approach predetermined delay such that ad-hoc synchronization is provided between the PLC and the I/O device.

In an embodiment, an interface module is provided for use with a networked input/output (I/O) device in industrial control network comprising a Programmable Logic Controller (PLC), a network coupled to the PLC, and a plurality of networked input/output (I/O) devices coupled to the network. The interface module comprises inputs coupled to the network to receive output data from the PLC as device input data and outputs coupled to the network to transmit output data from the I/O device as input data to the PLC. The module further comprises a programmable timer. The programmable timer initiates an I/O cycle for the I/O device on a periodic basis. The time period from arrival time of specific time-critical output data from the PLC plus the timer period is measured. The module is operable to compare the time period to a predetermined time period and is operable to adjust the period of the timer to provide ad-hoc synchronization between production time of the PLC and timing of the I/O device.

The interface module may comprise apparatus to compare the time period to the predetermined time period and apparatus to provide the programmable timer, and a processor.

The interface module may further comprise software executable by the processor to capture the arrival time of the specific time-critical data from the PLC; software executable by the processor to initiate an I/O cycle for the device based on a periodic timer; software executable by the processor to compare the time delay between arrival of output data from the PLC and the I/O cycle plus the timer period to a predetermined time delay; and software executable by the processor to adjust the period of the timer such that ad-hoc synchronization is provided between the PLC and the I/O device.

The interface module may comprise an interrupt handler operable to detect arrival of specific data from the PLC.

In an embodiment of a method of operating an industrial control network comprising a Programmable Logic Controller (PLC), a network coupled to the PLC, and a plurality of networked input/output (I/O) devices coupled to the network, the method comprises providing the following steps in each I/O device: providing a programmable timer; setting the timer to trigger on a periodic basis with a consistent time delay between the timer trigger and the arrival of predetermined data; determining a measured time period beginning at the actual arrival time of the predetermined data and ending upon completion of the timer period; processing the measured time period to minimize effects of timing jitter in PLC production of the predetermined data and network delays and to provide a filtered time difference; comparing the filtered time difference to a predetermined time period; and adjusting the period of the timer such that ad-hoc synchronization is provided between production time of the PLC and production time of the I/O device.

BRIEF DESCRIPTION OF THE DRAWING

The invention will be better understood by a reading of the following detailed description in conjunction with the drawing figures in which like designators identify like elements, and in which.

DETAILED DESCRIPTION

The present invention provides a device-level solution to the problem of synchronization without the expense of specialized synchronization hardware, software, and configuration tools.

In accordance with the principles of the invention, ad-hoc synchronization is provided between a PLC and each I/O device, without any specific protocol extensions or any distributed clock scheme.

Figure 1:
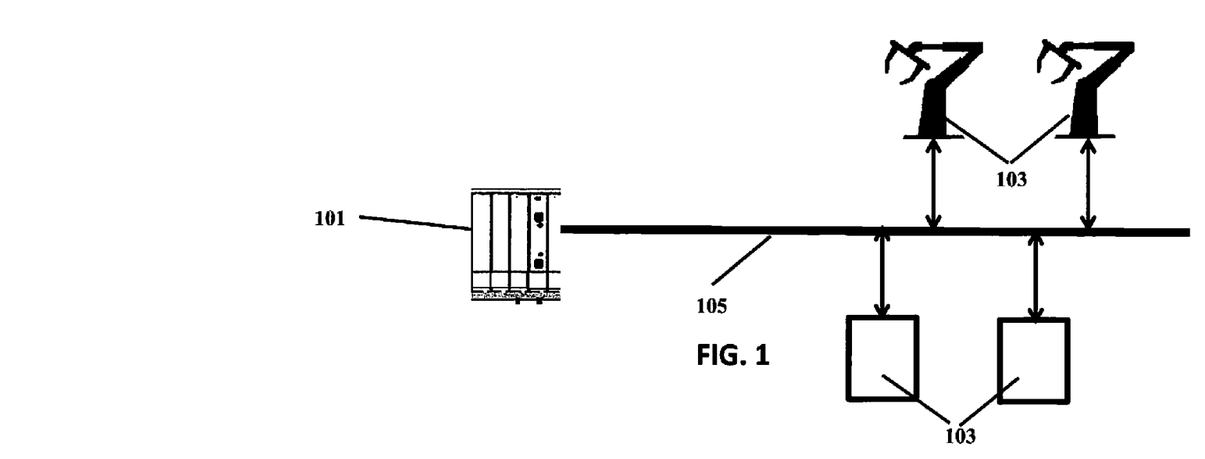
FIG. 1 is a simplified block diagram of an industrial network to which the invention is advantageously applied.

FIG. 1 illustrates a simplified industrial network 100 of the type to which the present invention is advantageously applied. Industrial network 100 is intended to only be representative of industrial network configurations in general. Those skilled in the art will appreciate that there may be any number of network configurations and it is not intended that the invention be limited to any one configuration.

Industrial network 100 includes a programmable logic controller PLC 101 that may be any one of a number of commercially available PLCs. PLC 101 communicates with a number of industrial network I/O devices 103 via network bus structure 105. Bus structure 105 may be any one of a number of bus structures utilized in industrial networking. I/O devices 103 may any of the type that are used in industrial networks. By way of non-limiting example I/O devices 103 may include assembly line devices.

Figure 2:
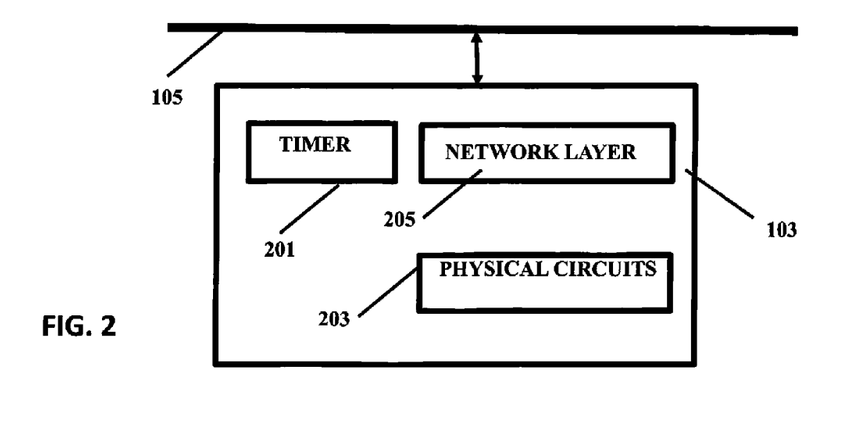
FIG. 2 is a simplified block diagram of a network device communication controller.

Each I/O device 103 comprises a programmable timer 201 as shown in FIG. 2.

In the following discussion, the term "inputs" or "input data" will refer to data read from external input circuits on I/O device 103 and transmitted over network 105 to the PLC, and the term "outputs" or "output data" will refer to data received from PLC 101 over network 105 and applied to external output circuits on I/O device 103.

In the various embodiments of the invention, it is desirable that the following four operations are synchronized:

1. The reading of external inputs to I/O device 103;
2. The writing of external Outputs from device 103;
3. The receiving of output data from PLC 101; and
4. The transmitting of input data to PLC 101.

Industrial network 100 as is typical of such systems tends to external inputs and outputs to I/O devices 103 "at the same time", meaning that "reading of external inputs to device 103" and "writing of external outputs from I/O device 103 can be considered to occur at the same time. Accordingly there are three sets of events of interest in terms of timing:

1. Performing external inputs and outputs at device 103;
2. The receiving of output data from PLC 101; and
3. The transmitting of input data to PLC 101.

"Receiving output data from PLC 101" is entirely under the control of the PLC 101.

In the case of a synchronous network, transmitting input data to PLC 101 is also under the control of the PLC 101, while only "performing external I/O" is under the control of I/O device 103.

In the case of an asynchronous network, both "Transmitting input data to the controller" and "Performing external I/O" are under the control of I/O device 103 in terms of timing.

I have determined that it is easiest to monitor and time "Transmitting input data to PLC 101" with respect to periodicity regardless of the nature of the specific inputs and outputs of I/O device 103.

Figure 3:
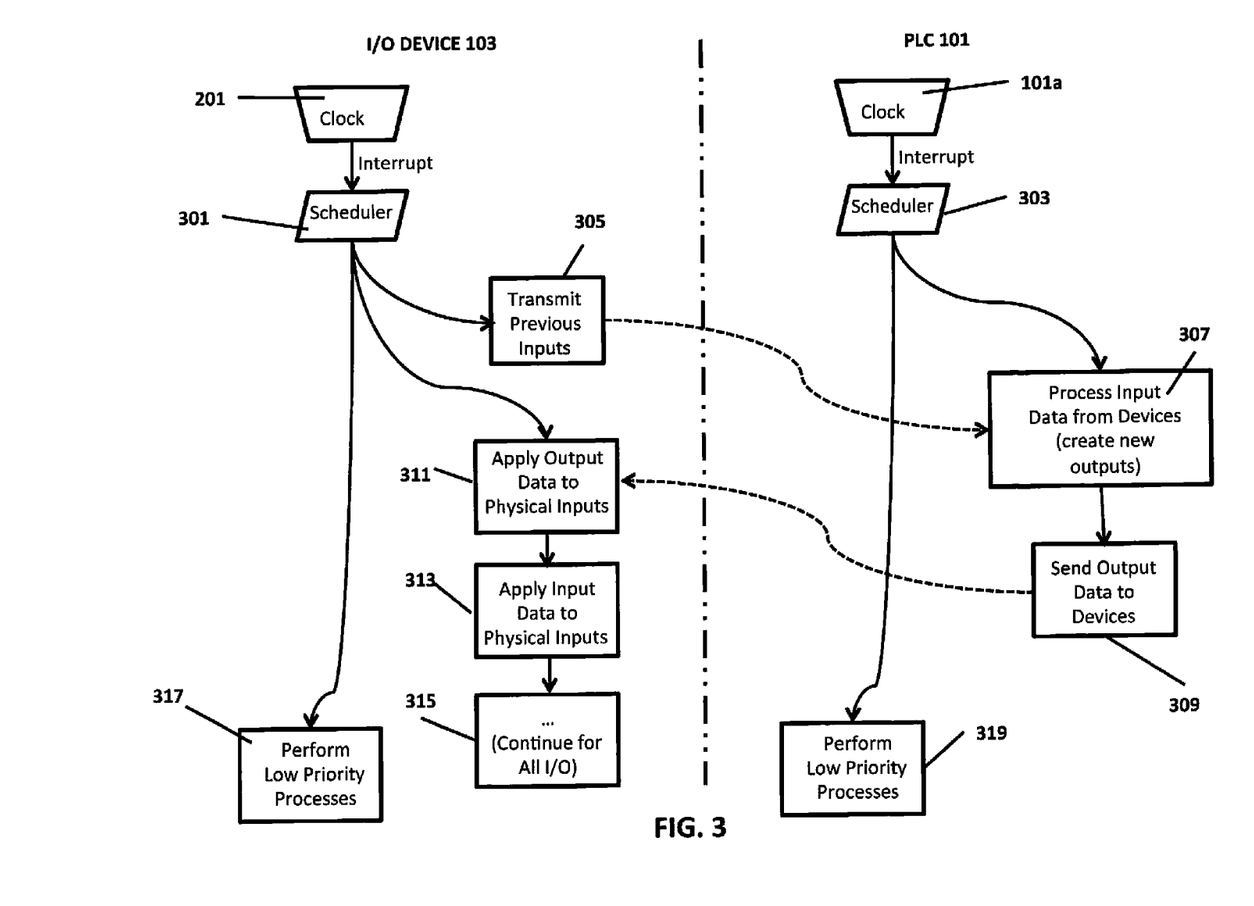
FIG. 3 illustrates the functional interaction between an I/O device and a programmable logic controller.

In the various embodiments, two clocks control processes of interest: one clock 201 on I/O device 103 and another clock 101a on PLC 101 as shown in FIG. 3.

I/O device 103 and PLC 101 are each interrupt driven, and interrupts may be classified as high priority and low priority. I/O device 103 comprises a communication scheduler 301 that controls the operations with data. Similarly PLC 101 comprises a communication scheduler 303.

For operations of high priority, I/O device transmits input data to PLC 101 at step 305. PLC 101 receives input data from I/O device 103 at step 307. PLC 101 processes the input data to create new output data that is transmitted to I/O device 103 at step 309. At step 311 I/O device 103 receives the output data. At step 313, I/O device 103 applies the output data to physical device inputs. Step 315 indicates that the process repeats for all PLC output data and input data.

For operations of low priority, I/O device 103 performs the associated low priority process at step 317 and PLC 101 performs low priority processes at step 319.

It may be assumed that the clock 201 of device 103 and clock 101a of PLC 101 drift with respect to each other. That is, even if both device 103 and PLC 101 try to perform their respective processes at the same frequency, say 1000 Hz, there will be a discrepancy between the timing of the clocks, because the oscillators they are based on are not ideal. For example, a difference between the two clocks of 25 parts-per-million (ppm) would not be unreasonable. At this difference, the faster clock would 'lap' the slower clock in a 1000 Hz period (1 msec.) roughly every 40 seconds. That is, the clocks would go through a 360 degree phase shift every 40 seconds.

Figure 4:
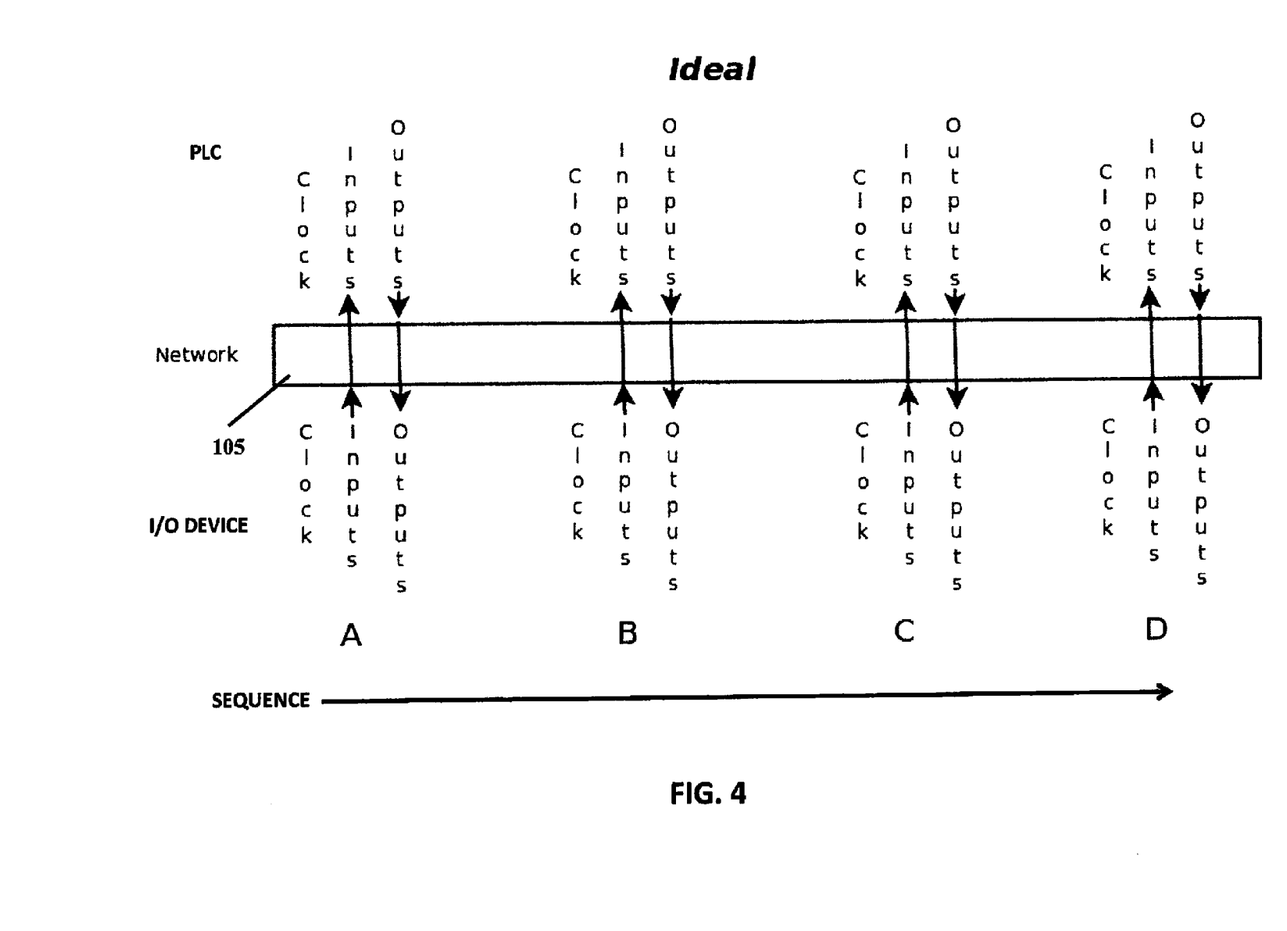
FIG. 4 illustrates a first data sequence relationship between an I/O device and a PLC.

FIG. 4 is a data sequence diagram that illustrates the data sequence of operation of an ideal industrial network 100. I/O device 103 clock 103a is perfectly in phase with PLC 101 clock 101a and there is no drift. Also the processing of I/O data and network operation is tuned so that at each data sequence A, B, C, D the freshest inputs are always available and the freshest outputs are always used.

Figure 5:
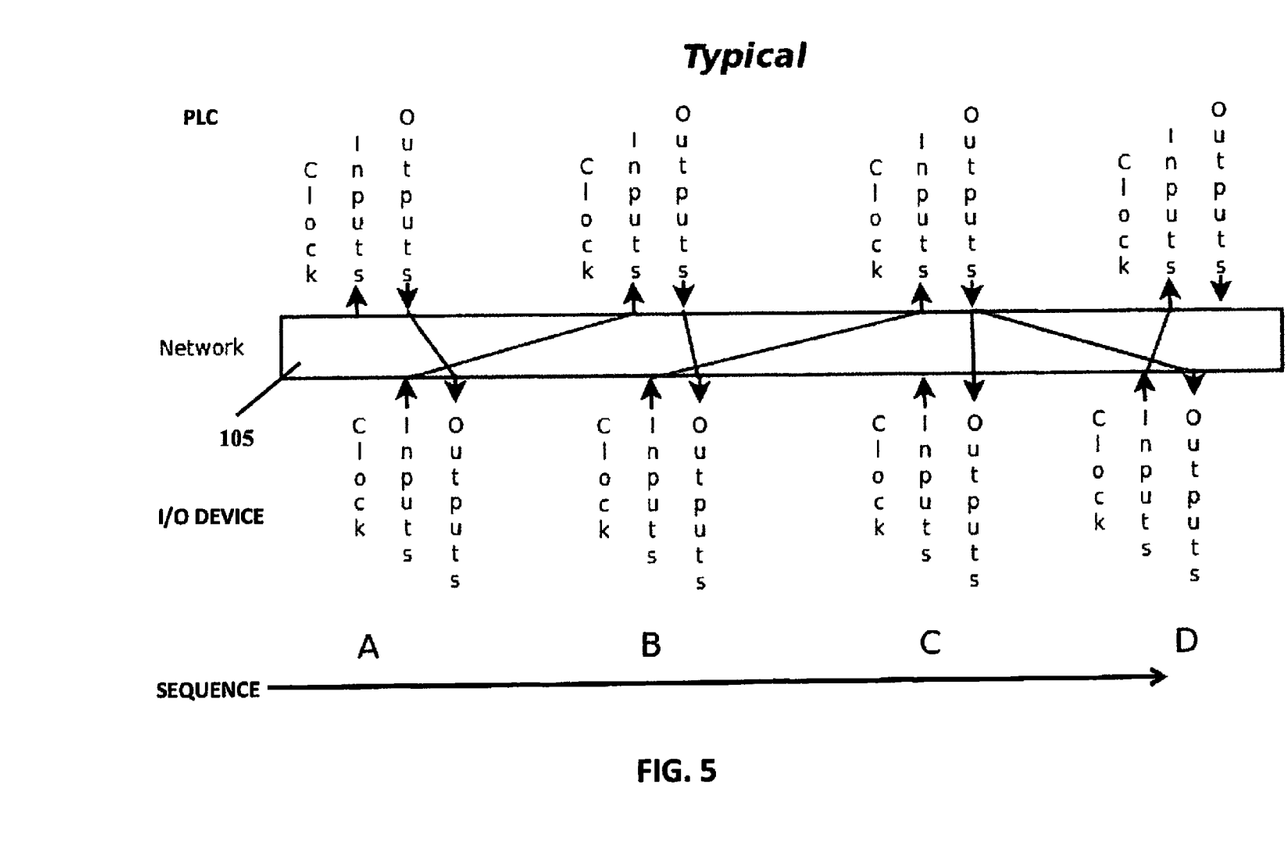
FIG. 5 illustrates a second data sequence relationship between an I/O device and a PLC.

A more typical scenario is shown in the data sequence diagram of FIG. 5.

In this example, I/O device 103 clock 201 runs faster than PLC 101 clock 101a. Similar results would be had if PLC 101 clock 101a ran faster than I/O device 103 clock 201. The sequence of operation is:

At A, clock 201 of I/O device 103 is running behind clock 101a of PLC 101. I/O device 103 uses fresh data for outputs at each time A, B, C, D and its inputs get queued up for the following cycle.

At B, the basic situation is unchanged, except that the delay between PLC 101 and I/O device 103 is now less.

At C, the two clocks, i.e., PLC 101 clock 101a and I/O device 103 clock 201, are in phase. The I/O is still the same as the two previous cycles, inputs are from the previous cycle and fresh outputs are applied.

At D, clock 201 on I/O device 103 is now "ahead" of PLC 101 clock 101*a*. This allows for the freshest inputs to be used by PLC 101 in this cycle, but the inputs from the previous cycle are superseded before they could be used and are missed altogether. Also, the outputs from the previous cycle are used a second time, and in following cycles the outputs will be much older than in previous cycles.

The data sequence shown in FIG. 5 occurs repeatedly in prior art asynchronous networks. This makes any type of precision control difficult because the relative latency of data is always changing and some points of data will be missed altogether.

To solve the synchronization problem, first it is important to determine exactly what should be synchronized. For industrial protocols, the intent is to synchronize the data processing loop and associated network activity on PLC 101 with the processing loop and network activity of the I/O device 103.

To provide synchronization at I/O device 103, the action of PLC 101 that is to be the basis for synchronization must be identified. One thing that all industrial networks have in common is the transmission of data from PLC 101 to I/O device 103. Although some I/O devices 103 don't have output data, there is dependably a transmission from PLC 101 to device 103 corresponding to the data cycle. The details of this vary depending on protocol.

A network utilizing PROFINET has a single cyclic message sent from PLC 101 to I/O device 103 once per cycle. This message is distinguishable by its Ethertype and some other, PROFINET-specific fields in the packet.

A network utilizing EtherNet/IP scanners transmits data to an I/O device 103 using a specific UDP port.

A network utilizing a Modbus/TCP PLC 101 transmits data to specific UDP ports.

A network utilizing a PROFIBUS PLC 101 sends a particular packet once per cycle.

Figure 6:
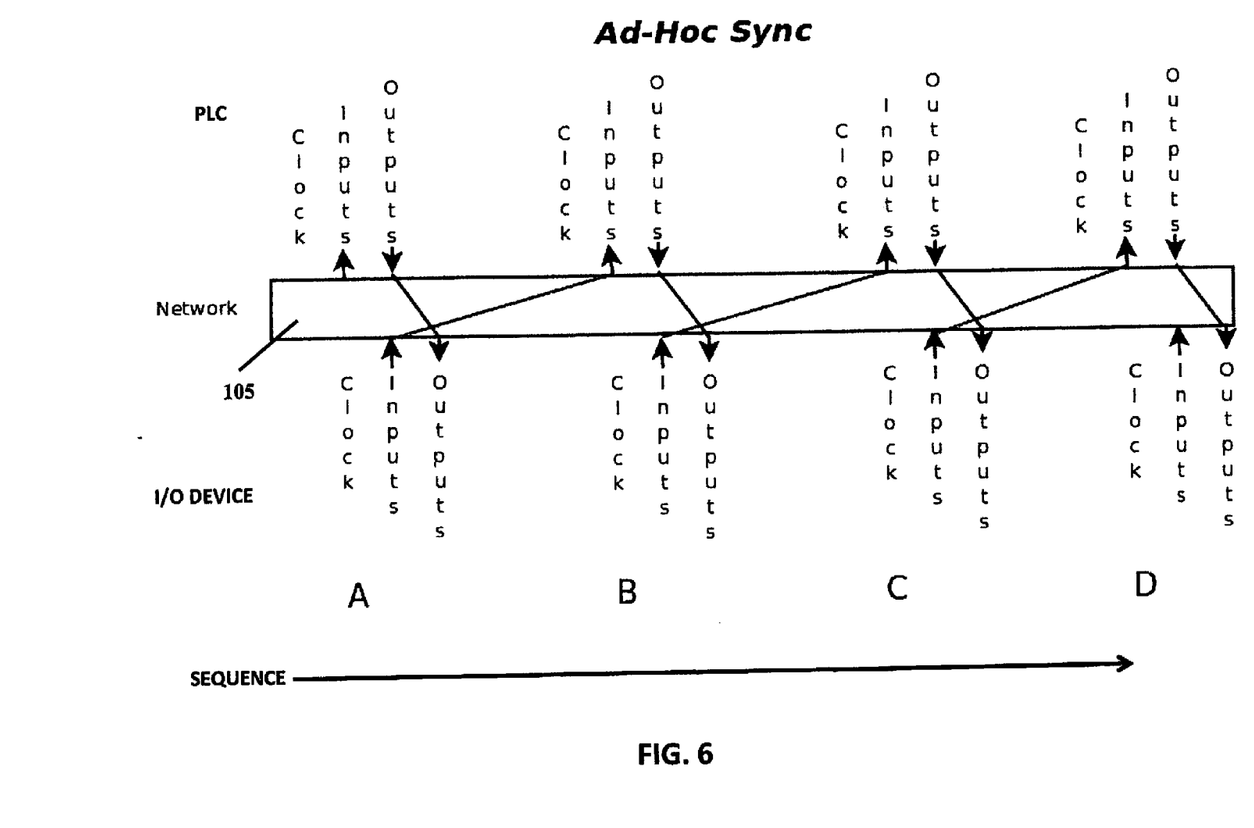
FIG. 6 illustrates a third data sequence relationship between an I/O device and a PLC.

FIG. 6 illustrates the data sequence of system 100 that uses ad-hoc synchronization in accordance with the principles of the invention.

The relative timing between PLC 101 and I/O device 103 does not change. The inputs and outputs are always of the same relative 'age' and there is no cycling in and out of phase as in a typical prior art network.

Ad-hoc synchronization is accomplished by synchronizing the I/O timer of I/O device 103 to the production time of PLC 101, i.e., the period between sets of outputs generated by PLC 101 and transmitted to I/O device 103.

The approach utilized in one ad-hoc synchronization embodiment may be thought of as a software-controlled phase-locked loop managing a programmable timer 201 at device 103. By synchronizing I/O timing of I/O device 103 to production time of PLC 101, the PLC output data arrival can be included in the I/O cycle of device 103:

1. Output data from the PLC 101 arrives over network bus arrangement 105.
2. Timer 201 fires.
3. Output data from network layer of software 205 is updated.
4. Read input data from and write output data to physical circuits 203.
5. Update input data to network layer of software 205.
6. Transmit input data over network bus arrangement 105.

Ad-hoc synchronization software provided in I/O device 103 keeps the timing from arrival of output data from PLC 101 on the network 105 to presentation of outputs on the physical circuits 203 consistent to minimize jitter as well as to keep the input timing consistent. Jitter is minimized in both cases and the problem of the doubling of the period due to phase crossing is completely eliminated.

In the example above, the base latency is 200 microseconds, which is consistent within the baseline jitter of the device processing, e.g., 2 microseconds.

The ad-hoc synchronization provided by I/O device 103 provides a much higher level of precision in the control network 100, maintaining the I/O jitter in the range of microseconds rather than more than twice the I/O period, without the cost and complexity of the complex hardware and software used in the various synchronized protocols, e.g., PROFINET IRT or CIP Sync.

Programmable timer 201, is used to provide the base period for the I/O cycle. Timer 201 is set to trigger at a base frequency with a consistent delay following the arrival of predetermined output data, or in the case of a synchronous network, I/O data.

Having identified the event that will drive the synchronization, I will now define how to synchronize our period to that of the controller.

Those skilled in the art may be tempted to just begin executing the I/O device 103 cycle based on receipt of output data from PLC 101 rather than maintaining a synchronized clock. Essentially that would make I/O device 103 event-driven based on controller traffic. I have determined that this is an undesirable approach because: the I/O cycle of I/O device 103 will jitter based on issues with PLC 101 timing and/or variable network delays; cycles may be missed when a packet is dropped on the network; and processing may be stopped when a series of packets from PLC 101 are lost or the network is somehow interrupted.

In accordance with the principles of the invention, an embodiment utilizes a periodic timer 201 to control the processing cycle. Timer 201 synchronizes to the events described above. To achieve such synchronization, the elapsed time between the protocol-specific synchronization event, i.e., the predetermined data, and firing of periodic timer 201 is measured and the timer is adjusted with considerable precision to synchronize to PLC 101.

Figure 7:
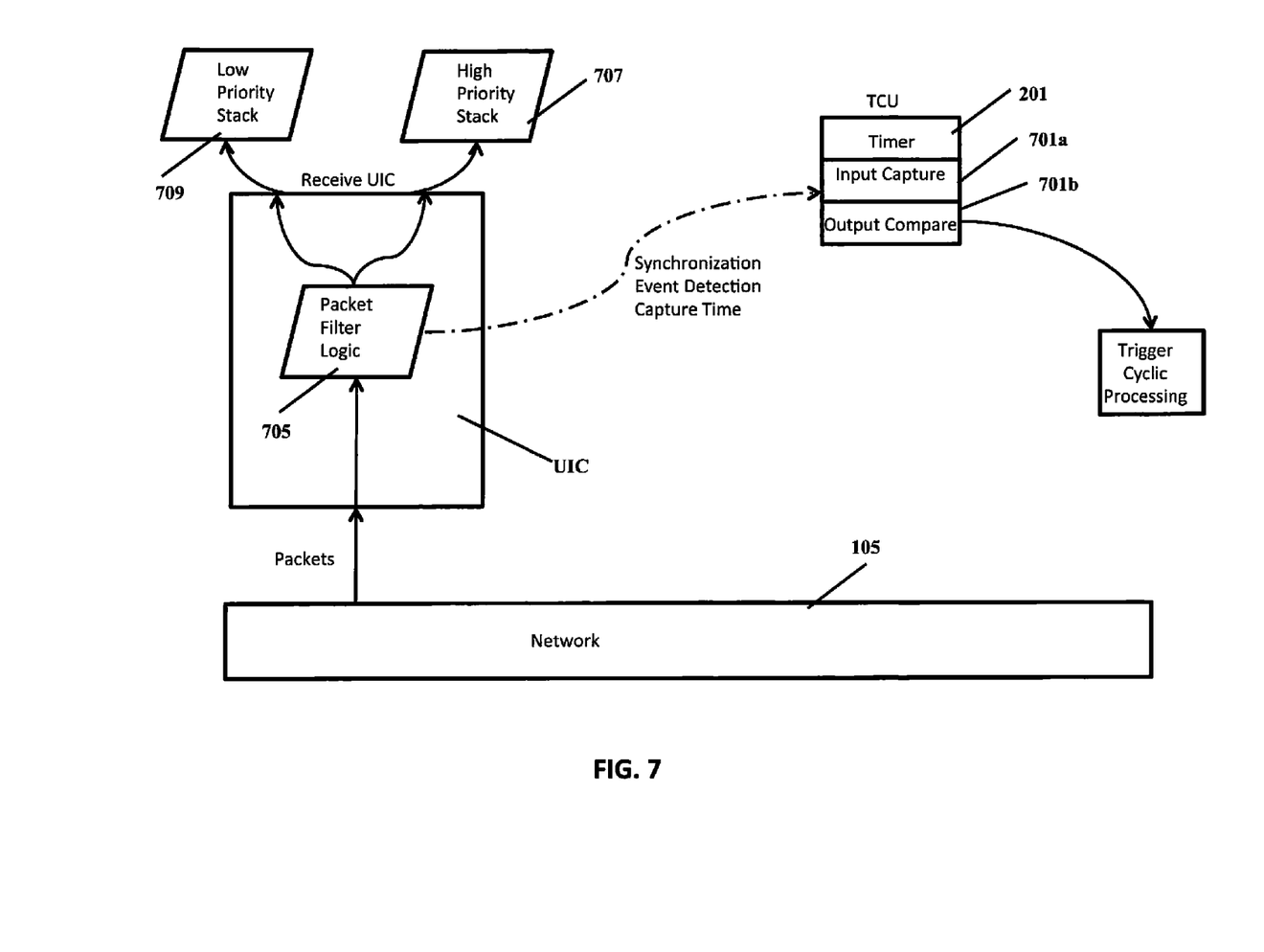
FIG. 7 is block diagram of an ad-hoc synchronization apparatus for use with an I/O device.

In an embodiment of the invention, an ad-hoc synchronization unit 700 shown in FIG. 7 comprises a timer-counter unit TCU provides ad-hoc synchronization. Timer counter unit TCU may be such as that described in conjunction with the Fido® 1100 microcontroller available from Innovasic, Inc. Timer counter unit TCU comprises a timer 201, input capture register 701*a* and an output compare register 701*b*.

Ad-hoc synchronization unit 700 also comprises a universal I/O controller UIC. Universal I/O controller UIC may be such as that described in conjunction with the Fido® 1100 microcontroller available from Innovasic, Inc.

Output data packets originating at PLC 101 are received from network 105 by universal I/O controller UIC. Universal I/O controller UIC comprises packet filter logic 705 that determines whether or not the data packet is a predetermined critical data packet. If the data packet is not a predetermined critical data packet, it is forwarded to low priority stack 709. If the data packet is a predetermined critical data packet Universal I/O controller UIC, forwards the predetermined critical data packet to high priority stack 707. Universal I/O controller UIC upon detecting that a data packet is a predetermined critical data packet, identifies the reception of the data packet as a synchronization event and asserts a signal to input capture register 701*a* of timer counter unit TCU, and the arrival time of the data packet is captured.

I have identified the synchronization event and the timer resource that will be used to both capture the difference between the event and the timer period.

Output compare register 701*b* is used to generate the basic timing for the period of timer 201.

Timer counter unit TCU is utilized as a very high precision, tunable timer. TCU 201 provides a mechanism to capture arrival time of incoming data packets from PLC101, generates a periodic interrupt, e.g., every 1 msec., to base the I/O cycle and various other processes, and is tunable with substantial precision to synchronize to the clock of PLC 101.

Timer counter unit TCU provides a mechanism to capture arrival time of incoming data packets from PLC 101. This is made straightforward by the signal from universal I/O controller UIC to Timer counter unit TCU. When universal I/O controller UIC distinguishes an appropriate packet early in packet arrival time, it asserts the signal and the time is captured in input capture register 701*a*.

I/O device 103 may be utilized in a synchronous network, such as, e.g., PROFIBUS or Modbus/TCP, to synchronize the I/O cycle on the I/O device 103 to the production cycle of the PLC 101.

1. Receive output data from PLC 101 and transmit input data to the network 105
2. Update output data from network layer of software 205
3. Read inputs from and write outputs to physical circuits 203
4. Update input data to network layer of software 205

Figure 8:
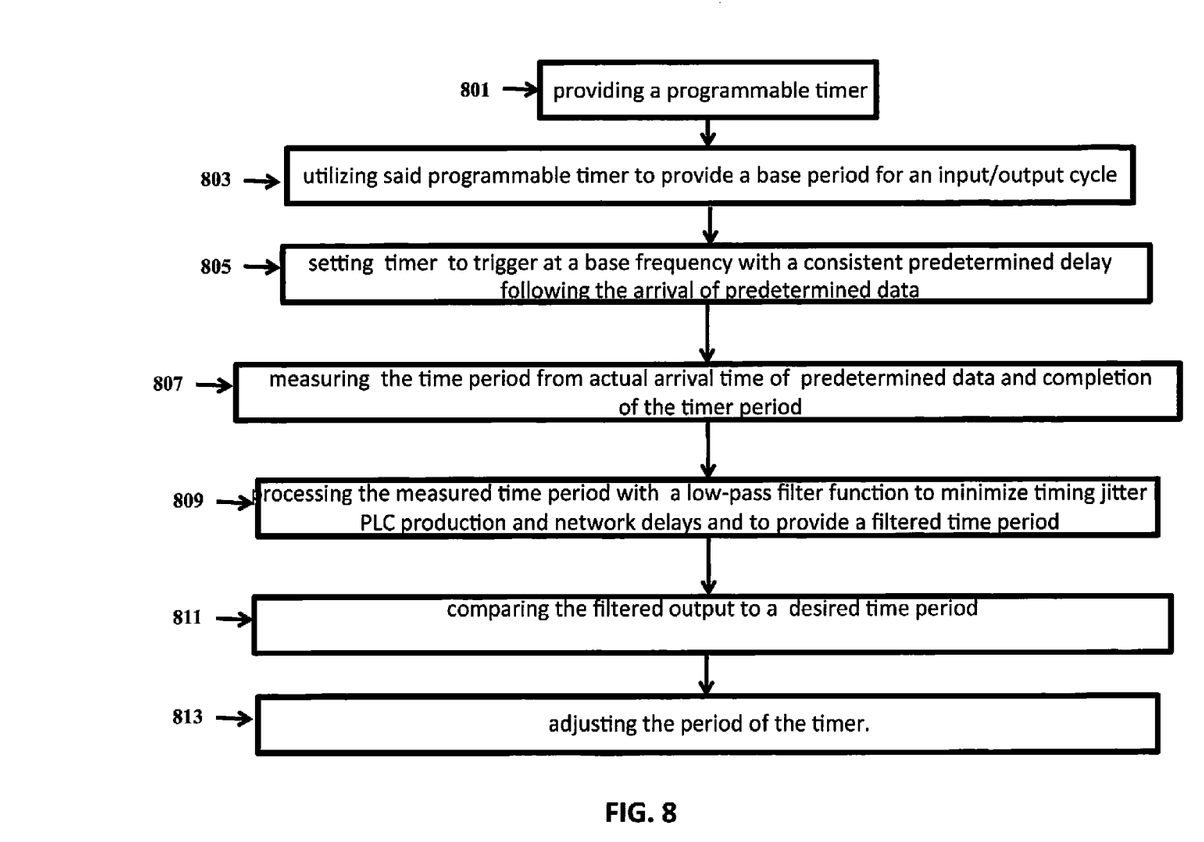
FIG. 8 illustrates method steps.

The methodology of an embodiment is illustrated in FIG. 8.

A programmable timer provided at step 801 is used to provide the base period for the I/O cycle as indicated at step 803. The programmable timer is set at step 805 to trigger at the base frequency with a consistent delay following the arrival of output data, or in the case of a synchronous network, I/O data.

At step 807 a time period is determined beginning at the actual arrival time of predetermined output data from the PLC 101 and ending at the end of the programmable timer period is determined. The determined time period is run through a low-pass filter at step 809 to account for timing jitter in PLC production time and network delays.

At step 811, the filtered output is compared to a predetermined time period. At step 813 the period of the timer is adjusted. The net effect of this is to synchronize the I/O cycle of device 103 and, for asynchronous networks, network production time with the timing of the operation of the PLC 101.

Figure 9:
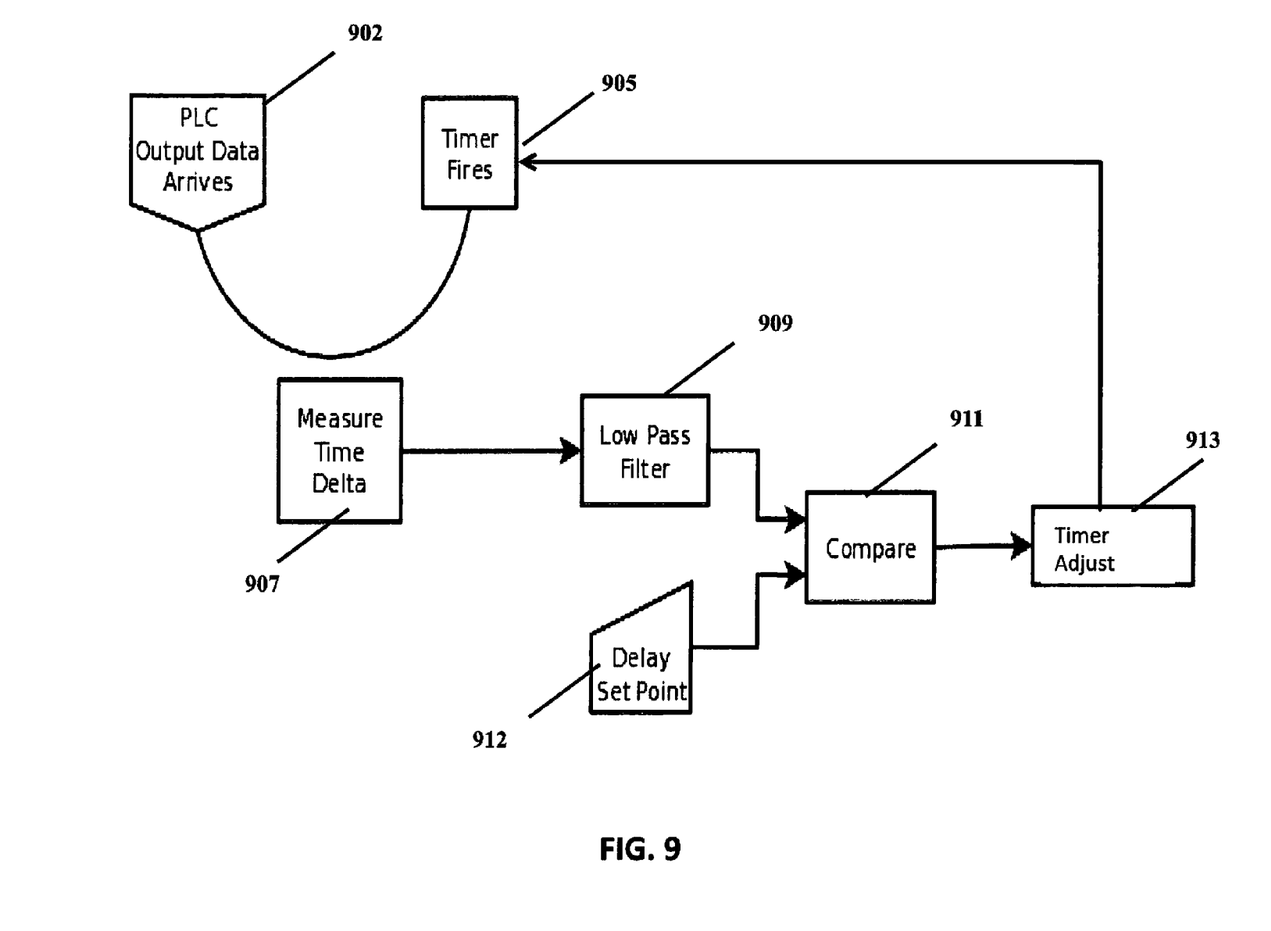
FIG. 9 is a functional block diagram of a portion of an embodiment of an I/O device.

Turning now to FIG. 9, a time period is determined beginning at the arrival time 502 of predetermined output data from PLC 101 is initiated and terminated at the end of the timer period occurring after the firing 905 of the I/O device timer. The measured time 907 is filtered utilizing a low-pass filter function 909 to account for timing jitter in PLC production and network delays.

The filter output is compared 911 to a predetermined time period 912. The period of I/O device timer is adjusted 913 to the desired time value. The effect of this is to synchronize the I/O cycle of I/O device 103 to the production time of PLC 101, and for asynchronous networks, to synchronize the network production time with the timing of operation of PLC 101.

As a first approximation, the foregoing can be implemented by capturing the arrival time of the predetermined output data from PLC 101 in communications software that manages the incoming packets.

In a second embodiment, the measurement method detects the predetermined data packets in a low-level interrupt handler before data packets are processed by the communications software.

In a third embodiment, hardware is provided to detects the predetermined data that needs to be timed, i.e., the output data packet, and captures the time difference with high accuracy. This last approach may be used with the Fido® 1100 microprocessor, commercially available from Innovasic, Inc., using the programmable universal input/output controller ("UIC") to determine which network traffic to synchronize to, and a signal from the UIC to a timer counter unit that will measure the delta between arrival time and timer firing.

In the various embodiments, control is provided over the timing of I/O device 103, but no control is provided over timing or order of operations of PLC 101.

The invention has been described in terms of various embodiments. It is not intended that the invention be limited by the embodiments shown and described. It will be appreciated by those skilled in the art that various changes and modifications may be made without departing from the scope of the invention. It is intended that the invention be limited only by the claims appended hereto.

What is claimed is:

1. An industrial control network comprising a programmable logic controller (PLC), a network coupled to said PLC, and a plurality of networked input/output (I/O) devices coupled to said network, each I/O device comprising:

inputs coupled to said network to receive output data from said PLC;

outputs coupled to said network to transmit input data to said PLC, said input data being produced by said each I/O device after receipt of said output data;

a periodic programmable timer to provide a programmable base period for I/O device I/O cycles, said periodic programmable timer providing an output trigger at a base frequency corresponding to said programmable base period;

apparatus to capture an arrival time of receipt of said output data and to determine a time delay between said receipt of said output data and a next output trigger from said periodic programmable timer;

a filter coupled to said apparatus to provide a filtered average time delay; and a comparator responsive to said filtered average time delay to adjust said programmable base period of said periodic programmable timer to be equal to said filtered average time delay to thereby provide device ad-hoc synchronization with said PLC.

2. An industrial control network in accordance with claim 1, wherein:

said comparator comprises a first physical apparatus.

3. An industrial control network in accordance with claim 2, wherein:

said periodic programmable timer comprises one of said first physical apparatus and a second physical apparatus.

4. An industrial control network in accordance with claim 1, wherein each I/O device comprises:

a processor.

5. An industrial control network in accordance with claim 4, wherein:

each I/O device comprises: software executable by said processor to capture said arrival time of said output data from said PLC.

6. An industrial control network in accordance with claim 5, wherein:

each I/O device comprises:

software executable by said processor to control said periodic programmable timer;

software executable by said processor to provide said comparator; and software executable by said processor to adjust said programmable base period of said periodic programmable timer.

7. An industrial control network in accordance with claim 5, wherein:
said output data comprises specific time critical data from said PLC; and
said apparatus comprises an interrupt handler to detect arrival of said output data comprising specific time critical data from said PLC.

8. An industrial control network in accordance with claim 7, wherein:
said comparator comprises software executable by said processor to adjust said programmable base period of said periodic programmable timer.

9. An interface module for use with a networked input/output (I/O) device in an industrial control network comprising a Programmable Logic Controller (PLC), a network coupled to said PLC, and a plurality of networked input/output (I/O) devices coupled to said network, said interface module comprising:
inputs coupled to said network to receive output data from said PLC as device input data;
outputs coupled to said network to transmit output data from said networked I/O device as input data to said PLC;
a periodic programmable timer operable to have a programmable base period for said networked I/O device I/O cycles, said periodic programmable timer providing an output trigger at a programmable frequency corresponding to said programmable base period;
said interface module is operable to determine a time delay from arrival of specific time critical output data from said PLC and a next output trigger from said periodic programmable timer;
said interface module is operable to filter and average said time delay; and
said interface module is operable to adjust said programmable base period to said filtered and averaged time delay to thereby achieve ad-hoc synchronization with said PLC.

10. An interface module in accordance with claim 9, comprising:
a first apparatus to adjust said programmable base period.

11. An interface module in accordance with claim 10, comprising:
one of said first apparatus and a second apparatus to provide said periodic programmable timer.

12. An interface module in accordance with claim 9, comprising: a processor.

13. An interface module in accordance with claim 12, comprising:
software executable by said processor to capture an arrival time of said specific time critical output data from said PLC.

14. An interface module in accordance with claim 13, wherein:
said periodic programmable timer comprises software executable by said processor to initiate said I/O cycles; and
said interface module comprises software executable by said processor to utilize said time delay to adjust said programmable base period such that ad-hoc synchronization is provided with said PLC.

15. An interface module in accordance with claim 13, comprising:

an interrupt handler, said interrupt handler detects said arrival of said specific time critical output data from said PLC.

16. An interface module in accordance with claim 15, comprising:
said periodic programmable timer comprises software executable by said processor to initiate said I/O cycles;
software executable by said processor to compare said time delay and the programmable base period of said periodic programmable timer; and
software executable by said processor to adjust said programmable base period of said periodic programmable timer to said time delay to thereby provide ad-hoc synchronization with said PLC.

17. A method of operating an industrial control network comprising a Programmable Logic Controller (PLC), a network coupled to said PLC, and a plurality of networked input/output (I/O) devices coupled to said network, said method comprising providing the following steps in each of said I/O devices:
providing a periodic programmable timer in each of said I/O devices, said periodic programmable timer having a programmable period for corresponding I/O cycles for each of said I/O devices;
setting said periodic programmable timer to provide a trigger output on a periodic basis corresponding to said programmable period in each of said I/O devices;
determining a time delay from arrival of output data from said PLC and said trigger output for each of said I/O devices;
processing said time delay to minimize effects of timing jitter and to average said time delay to provide a filtered time period for each of said I/O devices;
comparing said filtered time period to said programmable period for each of said I/O devices; and
adjusting said periodic programmable timer such that said programmable period equals said filtered time period to thereby provide ad-hoc synchronization with said PLC for each of said I/O devices.

18. A method in accordance with claim 17, comprising:
providing a first apparatus to compare said filtered time period to said programmable period for each of said I/O devices.

19. A method in accordance with claim 18, comprising:
providing one of said first apparatus and a second apparatus for said periodic programmable timer for each of said I/O devices.

20. A method in accordance with claim 17, comprising:
providing each of said I/O devices with a processor.

21. A method in accordance with claim 20, comprising:
providing software executable by said processor to capture said arrival time of said output data from said PLC for each of said I/O devices.

22. A method in accordance with claim 21, comprising:
utilizing said processor to compare said filtered time period to said programmable period for each of said I/O devices; and
utilizing said processor to adjust said programmable period such that said programmable period equals said filtered time period to thereby provide said ad-hoc synchronization with said PLC for each of said I/O devices.

23. A method in accordance with claim 21, comprising:
providing an interrupt handler for each of said I/O devices; and
utilizing said interrupt handler to detect arrival of said output data from said PLC for each of said I/O devices.

24. A method in accordance with claim 23, comprising:

utilizing said processor to compare said filtered time period to said programmable period for each of said I/O devices;

utilizing said processor to adjust said programmable to thereby provide ad-hoc synchronization with said PLC for each of said I/O devices.

25. A method comprising:

providing an interface module for use with a networked input/output (I/O) device in an industrial control network comprising a Programmable Logic Controller (PLC), a network coupled to said PLC, and a plurality of networked input/output (I/O) devices coupled to said network;

coupling inputs of said interface module to said network to receive output data from said PLC;

coupling outputs from said interface module to said network to transmit input data to said PLC;

providing said interface module with a periodic programmable timer having a programmable period for I/O cycles of said networked I/O device;

setting said periodic programmable timer to provide a trigger output to said networked I/O device on a periodic basis, said networked I/O device transmitting said input data upon occurrence of said trigger output;

measuring a time delay from arrival of said output data and a next trigger output;

processing said time delay to minimize effects of timing jitter in said output data to provide a filtered time period;

averaging said filtered time period to provide an average filtered time period;

comparing said average filtered time period to said programmable period; and operating said interface module to adjust said programmable period to equal said average filtered time period to thereby provide ad-hoc synchronization between said PLC and said networked I/O device.

26. A method in accordance with, claim 25, comprising:

providing said interface module with an apparatus to compare said average filtered time period to said programmable period.

27. A method in accordance with claim 25, wherein:

said periodic programmable timer comprises a programmable timer apparatus.

28. A method in accordance with claim 25, comprising:

providing said interface module with a microprocessor.

29. A method in accordance with claim 28, comprising:

utilizing said microprocessor to determine said average filtered time period; and utilizing said microprocessor to adjust said programmable period to equal said average filtered time period to thereby provide ad-hoc synchronization between said PLC and said networked I/O device.

30. A method in accordance with claim 28, comprising:

providing an interrupt handler; and utilizing said interrupt handler to detect arrival of said output data from said PLC.

* * * * *